United States Patent
Fukumoto

(10) Patent No.: US 7,158,457 B2
(45) Date of Patent: Jan. 2, 2007

(54) OPTICAL DISK DEVICE FOR RECORDING AT OPTIMUM RECORDING POWER

(75) Inventor: Makoto Fukumoto, Hamura (JP)

(73) Assignee: TEAC Corporation (JP)

( * ) Notice: Subject to any disclaimer, the term of this patent is extended or adjusted under 35 U.S.C. 154(b) by 565 days.

(21) Appl. No.: 10/284,765

(22) Filed: Oct. 31, 2002

(65) Prior Publication Data
US 2003/0086346 A1    May 8, 2003

(30) Foreign Application Priority Data
Nov. 5, 2001    (JP) .............................. 2001-339890

(51) Int. Cl.
*G11B 7/0045* (2006.01)
(52) U.S. Cl. .................................... 369/47.53
(58) Field of Classification Search ...................... None
See application file for complete search history.

(56) References Cited

U.S. PATENT DOCUMENTS

| | | | | |
|---|---|---|---|---|
| 6,418,102 | B1 | 7/2002 | Suga | 369/47.53 |
| 6,751,173 | B1 * | 6/2004 | Maeda | 369/47.31 |
| 6,925,042 | B1 * | 8/2005 | Nakajo | 369/47.53 |
| 2003/0058765 | A1 * | 3/2003 | Schreurs et al. | 369/47.53 |

FOREIGN PATENT DOCUMENTS

| | | |
|---|---|---|
| JP | 05-225570 | 9/1993 |
| JP | 05225570 A * | 9/1993 |
| JP | 2000-182244 | 6/2000 |
| JP | 2000-200416 | 7/2000 |
| JP | 2002-260229 | 9/2002 |
| JP | 2003-091824 | 3/2003 |

OTHER PUBLICATIONS

The office action issued by the Japanese Patent Office in the corresponding Japanese patent application citing the above references.

* cited by examiner

*Primary Examiner*—Wayne Young
*Assistant Examiner*—Nathan Danielsen
(74) *Attorney, Agent, or Firm*—Anderson Kill & Olick, PC

(57) ABSTRACT

An optical disk device for estimating optimum recording power for high speed recording at an outer part of an optical disk, with high accuracy, even when an OPC for high speed recording at the outer part cannot be performed. The optical disk device includes a first optimum recording power calculation part for performing test recording at a first speed lower than the maximum recording speed of a test area by using recording parameters of a required recording speed to calculate first optimum recording power, and a second optimum recording power calculation part for performing test recording at a second speed to calculate second optimum recording power. The first speed is different from the second speed. The optical disk device further includes an estimation part for estimating optimum recording power based on the first optimum recording power and the second optimum recording power.

20 Claims, 4 Drawing Sheets

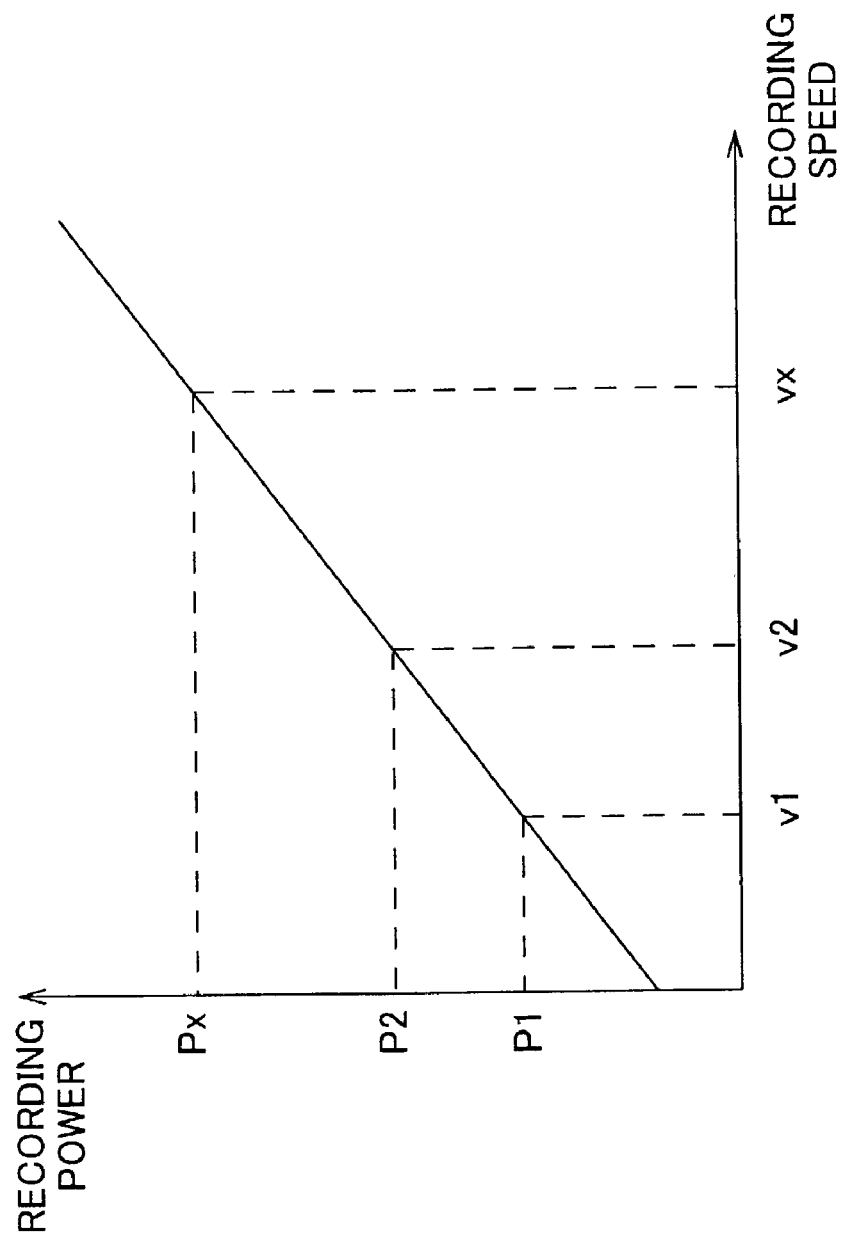

FIG.4A

CYANINE PIGMENT DISK

| RECORDING SPEED | OPTIMUM RECORDING POWER [mW] | β VALUE [%] WHEN ACTUAL RECORDING IS PERFORMED AT RECORDING POWER SHOWN LEFT |
|---|---|---|
| 8X(v1) | 15.15(P1) | 3.6 |
| 16X(v2) | 25.58(P2) | 4.2 |
| 24X(vx) | 36.01(Px) | 3.5 |

FIG.4B

PHTHALOCYANINE PIGMENT DISK

| RECORDING SPEED | OPTIMUM RECORDING POWER [mW] | β VALUE [%] WHEN ACTUAL RECORDING IS PERFORMED AT RECORDING POWER SHOWN LEFT |
|---|---|---|
| 8X(v1) | 13.60(P1) | −0.2 |
| 16X(v2) | 22.10(P2) | 0.1 |
| 24X(vx) | 30.06(Px) | 0.3 |

OPTICAL DISK DEVICE FOR RECORDING AT OPTIMUM RECORDING POWER

BACKGROUND OF THE INVENTION

1. Field of the Invention

The present invention relates to an optical disk device, and specifically to an optical disk device that performs recording on a write-once optical disk.

2. Description of the Related Art

There are two types of recording optical disks. That is, there are a write-once type and an erasable type. As for the write-once type, Te and Bi are used as material for a signal recording surface of the write-once optical disk, and the signal recording surface is irradiated by laser light to melt the surface and form a pit. Alternatively, a thin film of $Sb_2Se_3$, TeOx or an organic pigment is used as materials for the recording surface, and the recording surface is irradiated by laser light to vary light reflectance.

A CD-R which is the write-once type is provided with a pre-groove used as a guide. The pre-groove has a center frequency of 22.05 kHz, and slightly wobbles in a radial direction. Address information used at the time of recording is recorded as multi information at the pre-groove by FSK modulation with the maximum deviation being ±1 kHz. The address information is called ATIP (Absolute Time In Pre-groove). In the case of the CD-R that is the write-once optical disk, a recording power calibration operation called OPC (Optimum Power Control) is performed prior to recording in order to set the optimum recording power of laser light. A PCA (Power Calibration Area) is provided at an inner side (most inner side) of a data area of the optical disk recording surface. The data area is used for recording various data, and the PCA is a test recording area used for setting the optimum recording power of the laser light. The PCA includes a test area and a count area, and the test area includes 100 partitions. Each of these partitions includes 15 frames.

One OPC operation uses one of these partitions, and test signals are recorded on these 15 frames of the partition by using 15 levels of laser power from the minimum laser power to the maximum laser power. A peak value P and a bottom value B of an envelope of an RF (high frequency) signal reproduced from this test area are detected. A β value is obtained by using the equation: $\beta=(P+B)/(P-B)$. Recording power at which this obtained β value becomes a predetermined value is regarded as the optimum recording power, and subsequent signal recording is carried out based on the so-determined optimum recording power.

This optimum recording power determination for recording is made because manufactures each manufacture optical disks having different recording characteristics, and therefore, required optimum recording powers of the optical disks are different from each other. Accordingly, when optimum recording power cannot be obtained for each optical disk, an error rate and jitter after recording can greatly increase.

When recording is carried out at a CLV (Constant Linear Velocity) from the most inner area to the most outer area of the optical disk, the OPC may be carried out on the PCA of the most inner area at this constant recording velocity. However, in the case where high speed recording is performed, when the rotational speed of the optical disk is raised, a spindle motor that has high torque is required, resulting in cost increase. Furthermore, in this case, since vibration is generated at the time of the high speed rotation, servo tracking performance becomes inadequate.

In order to realize further higher speed recording with the rotational speed of the optical disk being limited to a certain value, ZCLV (Zone Constant Linear Velocity) recording and PCAV (Partial Constant Angular Velocity) recording have been proposed, and products for such recording have been manufactured. In both ZCLV and PCAV recording methods, high speed recording is realized by using an obtainable linear velocity at an outer part which is higher than the linear velocity at an inner part while the rotational speed of the optical disk is limited.

However, in both cases of the ZCLV recording and the PCAV recording, at the most inner area of the optical disk, it is impossible to obtain the linear velocity that is used for the high speed recoding at the outer part of the optical disk. Accordingly, the OPC for the high speed recording of the outer part cannot be performed at the PCA of the most inner area, and therefore, optimum recording power for the high speed recording of the outer part cannot be obtained.

SUMMARY OF THE INVENTION

With the view of the foregoing, it is an object of the present invention to provide an optical disk device that can estimate optimum recording power for high speed recording of an outer part of an optical disk, with high accuracy, even when the OPC for high speed recording of the outer part cannot be performed.

According to one aspect of the present invention, there is provided an optical disk device which performs recording on an optical disk by making a recording speed at an outer part of the optical disk higher than a recording speed at an inner part of the optical disk, the optical disk device comprising:

first optimum recording power calculation means for, in a case where test recording at a test recording area of a most inner area of the optical disk cannot be performed at a required recording speed, performing test recording at a first speed lower than a maximum recording speed which can be produced at the test recording area, the test recording at the first speed being performed by using a recording parameter which is determined based on the required recording speed, and calculating first optimum recording power corresponding to the first speed;

second optimum recording power calculation means for, in the above case, performing test recording at a second speed lower than the maximum recording speed which can be produced at the test recording area, the test recording at the second speed being performed by using the recording parameter which is determined based on the required recording speed, and calculating second optimum recording power corresponding to the second speed, wherein the second speed is different from the first speed; and estimation means for estimating optimum recording power based on the first optimum recording power and the second optimum recording power, wherein recording at the required recording speed is performed at the estimated optimum recording speed by the optical disk device.

With this optical disk device, even if the OPC for high speed recording at the outer part of the optical disk cannot be performed, optimum recording power at which this high speed recording at the outer part of the optical disk is to be performed can be estimated with high accuracy.

According to another aspect of the present invention, with the above-mentioned optical disk device, when test recording at the test recording area of the most inner area of the optical disk cannot be performed at a plurality of required recording speeds, the estimation means estimate each optimum recording power corresponding to each of the plurality of required recording speeds, based on the first optimum recording power and the second optimum recording power, and each recording at the plurality of required recording speeds is performed at the each estimated optimum recording power by the optical disk device.

With this optical disk device, it is possible to prevent the time required for the OPC from becoming long, and to prevent the PCA from being largely consumed.

Other objects, features, and advantages of the present invention will become more apparent from the following detailed description when read in conjunction with the accompanying drawings.

BRIEF DESCRIPTION OF THE DRAWINGS

FIG. 3 is a graph showing recording power characteristics as related to recording speeds;

FIG. 4A is a table showing recording speeds, recording powers, and β values (percentages) obtained by experiments; and FIG. 4B is another table showing recording speeds, recording powers, and β values (percentages) obtained by experiments.

DETAILED DESCRIPTION OF THE PREFERED EMBODIMENTS

Figure 1:
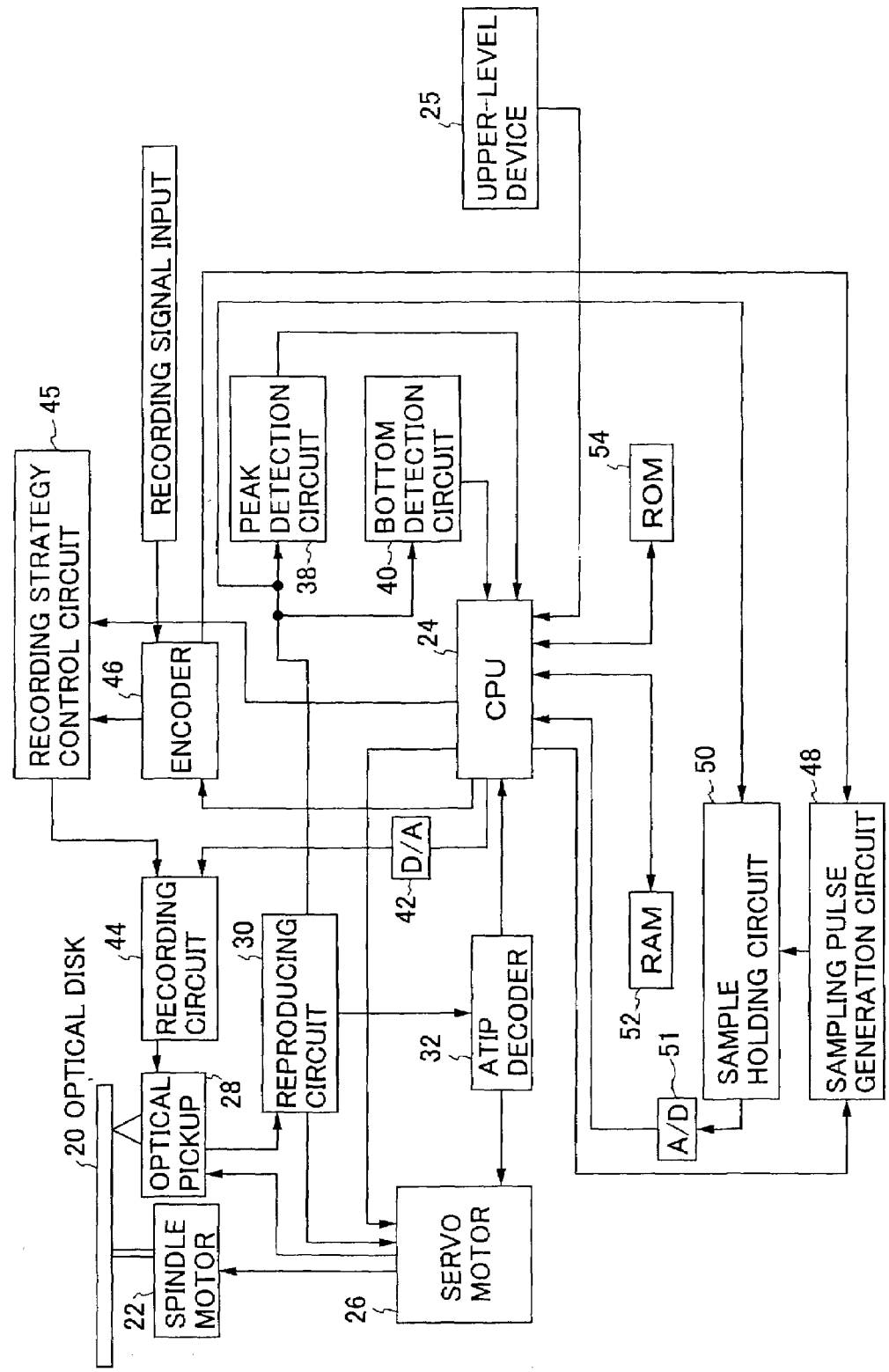
FIG. 1 is a block diagram showing one embodiment of an optical disk device according to the present invention.

FIG. 1 is a block diagram showing one embodiment of an optical disk device according to the present invention. In FIG. 1, an optical disk 20 is driven and rotated by a spindle motor 22. A CPU 24 provides a command to a servo circuit 26 in accordance with a writing/reading command given by an upper-level device 25.

The servo circuit 26 controls a rotational speed of the spindle motor 22 based on a recording speed provided by the CPU, and may perform CLV servo. Furthermore, the servo circuit 26 performs rotational control of a thread motor of an optical pickup 28 to move the optical pickup 28 to a desired block of the optical disk, and performs focus servo and tracking servo of the optical pickup 28.

Laser light emitted from the optical pickup 28 is reflected on a recording surface of the optical disk 20, and the reflected beam is then detected by the optical pickup 28. A reproducing RF signal obtained in the optical pickup is provided to a reproducing circuit 30. At the reproducing circuit 30, the reproducing signal is amplified, and the amplified reproducing signal is provided to the servo circuit 26. In addition, after at the reproducing circuit 30, EFM demodulation is performed on the amplified reproducing signal, an ATIP signal is separated from the signal, and is provided to an ATIP decoder 32. Furthermore, the synchronized demodulated signal is provided to a decoder (not shown) to undergo Laser light emitted from the optical pickup 28 is reflected on a recording surface of the optical disk 20, and the reflected beam is then detected by the optical pickup 28. A reproducing RE signal obtained in the optical pickup is provided to a reproducing circuit 30. At the reproducing circuit 30, the reproducing signal is amplified, and the amplified reproducing signal is provided to the servo circuit 26. In addition, after the reproducing circuit 30, EFM demolulation is performed on the amplified reproducing signal, an ATIP signal is separated from the signal, and is provided to an ATIP decoder 32.

The reproducing signal output from the reproducing circuit 30 is provided to a peak detection circuit 38 and a bottom detection circuit 40. The peak detection circuit 38 detects a peak value P of an envelope of the reproducing signal, and provides the detected peak value to the CPU 24. The bottom detection circuit 40 detects a bottom value B of the envelope of the reproducing signal, and provides the detected bottom value to the CPU 24.

The CPU 24 generates a recording power control signal based on a β value which is obtained by using the equation: $\beta=(P+B)/(P-B)$ where P is the peak value and B is the bottom value. This recording power control signal is converted into analogue data by a digital/analogue converter 42, and is then provided as a recording power control voltage to a recording circuit 44.

In accordance with instructions concerning recording speed and recording characteristics of the optical disk, a recording strategy control unit 45 corrects rising and falling of a recording pulse of an EFM signal provided from an encoder 46. Then, the strategy control unit 45 provides the corrected EFM signal to the recording circuit 44.

In accordance with control by the CPU 24, the encoder 46 applies CIRC (Cross Interleave Reed-Solomon Code) encoding and EFM modulation to the input recording signal, and then provides the recording signal to the strategy control unit 45.

The recording circuit 44 controls the signal provided from the strategy control unit 45 to set the recording power in accordance with the recording power control voltage. This controlled signal is provided to a laser diode (LD) in an optical pickup 28 to drive the laser diode. In this manner, laser light is applied to the optical disk 20 to perform signal recording.

When the OPC or a running OPC is performed, the encoder 46 provides a recording signal to a sampling pulse generation circuit 48, and the sampling pulse generation circuit 48 generates a sampling pulse at a timing of sampling a reproducing signal at a back end part of a pit part that has a time width of 11T, and provides the generated sampling pulse to a sample holding circuit 50. A standard time width T is 230 nano-seconds corresponding to one period of 4.32 MHz frequency in a standard speed, i.e., one time speed (1×speed).

The sample holding circuit 50 samples a signal level provided from the reproducing circuit 30, and holds the sampled signal level. The held signal level is converted into digital data by the analogue/digital converter 51, and is then provided to the CPU 24. The digital data of the held signal level are stored in a PAM 52. This held signal level varies depending on how the recording pit is formed. The held signal level obtained at optimum recording power in the OPC is stored in the RAM 52 in advance. This stored held signal level is compared with a held signal level obtained at the time of information recording, and recording power is controlled based on a result of this comparison.

The ROM 54 including an EEPROM connected to the CPU 24 registers types of the optical disks (ID numbers), starting powers of the OPC and stepping powers based on the types of the optical disks, recording strategies and β values each based on a plurality of recording speeds of the respective optical disk types.

Figure 2:
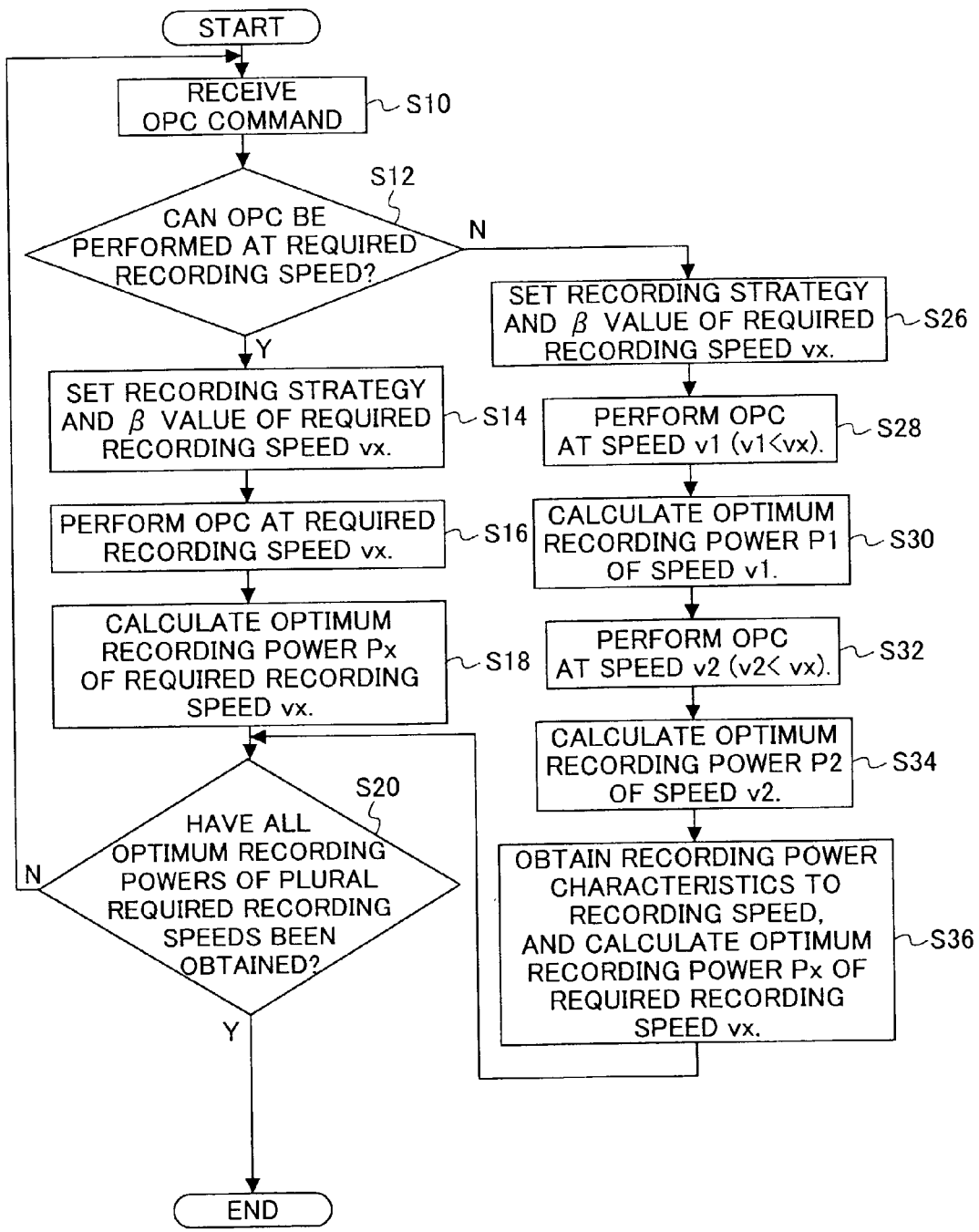
FIG. 2 is a flow chart showing one embodiment of an OPC operation performed by a CUP of the optical disk device shown in FIG. 1.

FIG. 2 shows a flow chart of one embodiment of an OPC operation performed by the CPU 24 of the optical disk device according to the present invention. The process of this operation is started at the time an OPC command is provided from the upper-level device 25. At the start of the operation, the type of the optical disk (ID number) has already been obtained from the ATIP information. The following description is directed to a procedure of a process for the optical disk having this ID number.

In FIG. 2, the optical disk device receives the OPC command in step S10. In step S12, it is determined whether or not a required recording speed vx included in the OPC command is equal to or less than the maximum speed at which recording can be carried out at the PCA of the most inner area, i.e., whether or not the OPC can be performed at the required recording speed vx.

When it is determined that the OPC can be carried out at the required recording speed, the procedure proceeds to step S14 where the β value and the recording strategy are read from the ROM 54 and are set as recording parameters of the required recording speed vx. Next, at step S16, a rotational speed of the spindle motor 22 is controlled to provide the required recording speed vx, and the OPC is performed. At step S18, optimum recording power Px of the required recording speed vx is calculated based on a result of the OPC.

Then, at step S20, it is determined whether or not a plurality of required recording speeds exist and all of optimum recording powers of a plurality of recording speeds have already been obtained. When it is determined that all of the recording powers have not been obtained yet, the procedure proceeds to step S12, and steps S14 to S18 are repeated. On the other hand, when it is determined that all of optimum recording powers have already been obtained, this procedure is terminated.

Meanwhile, when in step S12, it is determined that the OPC cannot be performed at the required recording speed vx, the procedure proceeds to step S26 where the β value and the strategy of the required recording speed vx are read from the ROM 54, and are set. The rotational speed of the spindle motor 22 is controlled to provide a recording speed v1 lower than the recording speed vx (v1<vx), and the OPC is performed. Then, at step S30, optimum recording power P1 at the recording speed v1 is calculated based on a result of the OPC.

Next, at step S32, the rotational speed of the spindle motor 22 is controlled to provide a recording speed v2 lower than the recording speed vx but greater than the recording speed v1 in this example (v1<v2<vx), and the OPC is performed. Then, at step S34, optimum recording power P2 at the recording speed v2 is calculated based on a result of the OPC. Next, an approximation line that shows the relationship of recording powers to recording speeds is formed by using the optimum recording powers P1 at the recording speed v1 and the optimum recording power P2 at the recording speed v2, as shown in FIG. 3, where the β value of the required recording speed vx and the recording strategy have been set to the OPCs of the recording speeds v1 and v2. Next, optimum recording power Px at the required recording speed vx is obtained by the equation (1):

$$Px = \{(P2-P1)/(v2-v1)\} \times vx + P2 - v2(P2-P1)/(v2-v1) \quad (1)$$

The obtained Px is stored in the RAM 52, and the procedure proceeds to step S20. Inclination of the approximation line of the relationship of the recording powers to recording speeds varies depending on the β value.

FIGS. 4A and 4B show the recording speeds, the optimum recording powers, and the β values (percentages) obtained by experiments. FIG. 4A shows experimental values obtained in the case of the optical disk to which cyanine pigments were applied as signal recording materials. FIG. 4B shows experimental values in the case of the optical disk to which phthalocyanine pigments were applied as signal recording materials. The β value of the recording speeds in each optical disk was approximately constant.

For example, in the case where the optical disk device has 16 times maximum recording speed capability at the PCA of the most inner area, and in the case of the ZCLV recording in which a recording speed at an inner part of a data area is 8 times speed (8×speed), a recording speed at a middle part of the data area is 16 times speed, and an outer part of the data area is 24 times speed, steps S14 to S18 are repeatedly carried out for each of 8 times speed and 16 times speed, which are required recording speeds vx. As for 24 times speed which is the required recording speed vx, the recording speed v1 at step S28 may be 8 times speed (or 4 times speed), and the recording speed v2 at step S32 may be 16 times speed (or 10 times speed).

In addition, also in the case where the optical disk device has 16 times maximum recording speed at the PCA of the most inner area, and in the case of the PCAV recording in which a recording speed at an outer part of a data area is 24 times speed, the above-described operation may be performed with the required recording speed vx being 24 times speed.

In this manner, even when the OPC for the high speed recording of the outer part of the optical disk cannot be carried out, it is possible to estimate optimum recording power of the high speed recording of the outer part, with higher accuracy, and to realize high recording quality even at the outer part of the optical disk.

When there are a plurality of required recording speeds at which the OPC cannot be performed, i.e., in the case where the optical disk device has 16 times maximum recording speed at the PCA of the most inner area and in the case of the ZCLV recording in which a recording speed at the inner part of the data area is 16 times speed, a recording speed at the middle part is 20 times speed, and a recording speed at the outer part is 24 times speed, steps S26 to S34 may be repeatedly carried out for 20 times speed and 24 times speed that are the required recording speeds. However, in such a case where there are a plurality of required recording speeds at which the OPC cannot be performed, the OPC needs to be performed a plurality of times for one recording process, the time necessary for the OPC becomes longer, and the PCA is largely consumed.

In order to avoid the longer time of the OPC and the larger consumption of the PCA, the recording strategies to be set for a plurality of required recording speeds vx1, vx2, and vx3 are made to be the same. In this manner, it becomes sufficient that steps S26 to S34 are carried out once. In this case, for example, the recording strategy of the highest required recording speed vx1 out of a plurality of required recording speeds vx1, vx2 and vx3 may be set. Accordingly, accuracy of this same recording strategy set for other required recording speeds vx2 and vx3 is reduced, but there are performance margins in the required recording speeds vx2, and vx3 because the recording speeds are lower. For this reason, recording qualities of the required recording speeds vx2 and vx3 can be approximately equal to recording quality of the maximum required recording speed vx1.

Steps S26 to S30 correspond to the first optimum recording power calculation means in the claims, steps S32 to S34 correspond to the second optimum recording power calculation means in the claims, and step S36 corresponds to the estimation means in the claims.

The present invention is not limited to the above-described embodiments, and may be embodied in other various specific forms without departing from the scope of the invention.

This patent application is based on Japanese priority patent application No. 2001-339890 filed on Nov. 5, 2001, the entire contents of which are hereby incorporated by reference.

What is claimed is:

1. An optical disk device which performs recording on an optical disk by making a recording speed at an outer part of the optical disk higher than a recording speed at an inner part of the optical disk, the optical disk device comprising:
   determination means for providing an output signal corresponding to a determination that a test recording at a test recording area of a most inner area of the optical disk cannot be performed at a required recording speed;
   first optimum recording power calculation means responsive to said output signal for performing test recording at a first speed lower than a maximum recording speed which can be produced at the test recording area, the test recording at the first speed being performed by using a recording parameter which is determined based on the required recording speed, and calculating first optimum recording power corresponding to the first speed;
   second optimum recording power calculation means responsive to said output signal for performing test recording at a second speed lower than the maximum recording speed which can be produced at the test recording area, the test recording at the second speed being performed by using the recording parameter which is determined based on the required recording speed, and calculating second optimum recording power corresponding to the second speed, wherein the second speed is different from the first speed; and
   estimation means for estimating optimum recording power corresponding to the required recording speed based on the first calculated optimum recording power and the second calculated optimum recording power,
   wherein recording at the required recording speed is performed at the estimated optimum recording power by the optical disk device.

2. The optical disk device according to claim 1, wherein when test recording at the test recording area of the most inner area of the optical disk cannot be performed at a plurality of required recording speeds, the estimation means estimate each optimum recording power corresponding to each of the plurality of required recording speeds, based on the first optimum recording power and the second optimum recording power, and each recording at the plurality of required recording speeds is performed at the each estimated optimum recording power by the optical disk device.

3. The optical disk device according to claim 1, wherein said estimated optimum recording power is obtained by using an equation:

$$Px = \{(P2-P1)/(v2-v1)\} \times vx + P2 - v2 \times (P2-P1)/(v2-v1)$$

where Px is said estimated optimum recording power, P1 is the first optimum recording power, P2 is the second optimum recording power, v1 is the first speed, v2 is the second speed, and vx is the required recording speed.

4. The optical disk device according to claim 2, wherein said each estimated optimum recording power is obtained by using an equation:

$$Px = \{(P2-P1)/(v2-v1)\} \times vx + P2 - v2 \times (P2-P1)/(v2-v1)$$

where Px is said each optimum recording power, P1 is the first optimum recording power, P2 is the second optimum recording power, v1 is the first speed, v2 is the second speed, and vx is each of the plurality of required recording speeds.

5. The optical disk device according to claim 1, wherein said recording parameter includes a recording strategy which is determined based on the required recording speed.

6. The optical disk device according to claim 4, wherein only one of a plurality of recording strategies which are each determined based on the plurality of required recording speeds is used as said recording parameter.

7. The optical disk device according to claim 6, wherein a recording strategy determined based on a required recording speed which is highest of the plurality of required recording speeds is said only one of recording strategies.

8. The optical disk device according to claim 2, wherein the recording is performed using a Zone Constant Linear Velocity recording method, and the plurality of required recording speeds correspond to recording speeds at respective parts of the optical disk.

9. The optical disk device according to claim 1, wherein the recording is performed using a Partial Constant Angular Velocity recording method.

10. The optical disk device according to claim 1, wherein the optical disk is a write-once type.

11. A method of estimating optimum recording power, comprising the steps of:
   determining if a test recording at a test recording area of a most inner area of the optical disk can be performed at a required recording speed;
   in response to a determination that a test recording cannot be performed at a required recording speed at a test recording area of a most inner area of an optical disk, performing the test recording at a first speed lower than a maximum recording speed which can be produced at the test recording area, the test recording at the first speed being performed by using a recording parameter determined based on the required recording speed;
   calculating first optimum recording power corresponding to the first speed;
   performing a second test recording in response to a determination that the test recording cannot be performed at a required recording speed at a second speed lower than the maximum recording by using the recording parameter determined based on the required recording speed, the second speed being different from the first speed;
   calculating second optimum recording power corresponding to the second speed;
   estimating optimum recording power corresponding to the required recording speed, based on the first optimum recording power and the second optimum recording power; and
   performing recording on the optical disk at the required recording speed at the estimated optimum recording power.

12. The method of estimating optimum recording power according to claim 11, further comprising the step of:
   in a case where test recording at the test recording area of the most inner area of the optical disk cannot be performed at a plurality of required recording speeds, estimating each optimum recording power corresponding to each of the plurality of required recording speeds, based on the first optimum recording power and the second optimum recording power, and performing each recording on the optical disk at each of the plurality of required recording speeds at the each estimated optimum recording power.

13. The method of estimating optimum recording power, according to claim 11, wherein in the step of estimating the optimum recording power corresponding to the required recording speed, said optimum recording power corresponding to the required recording speed is estimated by using an equation:

$$Px = \{(P2-P1)/(v2-v1)\} \times vx + P2 - v2x\,(P2-P1)/(v2-v1)$$

where Px is said estimated optimum recording power, P1 is the first optimum recording power, P2 is the second optimum recording power, v1 is the first speed, v2 is the second speed, and vx is the required recording speed.

14. The method of estimating optimum recording power, according to claim 12, wherein in the step of estimating said each optimum recording power, said each optimum recording power is estimated by using an equation:

$$Px = \{(P2-P1)/(v2-v1)\} \times vx + P2 - v2x\,(P2-P1)/(v2-v1)$$

where Px is said each estimated optimum recording power, P1 is the first optimum recording power, P2 is the second optimum recording power, v1 is the first speed, v2 is the second speed, and vx is each of the plurality of required recording speeds.

15. The method of estimating optimum recording power according to claim 11, wherein said recording parameter includes a recording strategy determined based on the required recording speed.

16. The method of estimating optimum recording power, according to claim 14, wherein only one of a plurality of recording strategies each determined based on the plurality of required recording speeds is used as said recording parameter.

17. The method of estimating optimum recording power, according to claim 16, wherein a recording strategy determined based on a required recording speed which is highest of the plurality of required recording speeds is said only one of recording strategies.

18. The method of estimating optimum recording power, according to claim 12, wherein recording is performed using a Zone Constant Linear Velocity recording method, and the plurality of required recording speeds each correspond to recording speeds at respective parts of the optical disk.

19. The method of estimating optimum recording power, according to claim 11, wherein recording is performed using a Partial Constant Angular Velocity recording method.

20. The method of estimating optimum recording power according to claim 11, wherein the optical disk is a write-once type.

* * * * *